United States Patent
Gorenz et al.

(10) Patent No.: US 11,885,410 B2
(45) Date of Patent: Jan. 30, 2024

(54) PLANETARY GEAR BOX

(71) Applicant: Rolls-Royce Deutschland Ltd & Co KG, Blankenfelde-Mahlow (DE)

(72) Inventors: Paul Gorenz, Berlin (DE); Maximilian Prölss, Berlin (DE)

(73) Assignee: ROLLS-ROYCE DEUTSCHLAND LTD & CO KG, Blankenfelde-Mahlow (DE)

( * ) Notice: Subject to any disclaimer, the term of this patent is extended or adjusted under 35 U.S.C. 154(b) by 0 days.

(21) Appl. No.: 17/893,771

(22) Filed: Aug. 23, 2022

(65) Prior Publication Data

US 2023/0063906 A1  Mar. 2, 2023

(30) Foreign Application Priority Data

Aug. 31, 2021 (DE) ...................... 10 2021 122 450.0

(51) Int. Cl.
*F16H 57/08* (2006.01)
*F02C 7/36* (2006.01)

(52) U.S. Cl.
CPC .............. *F16H 57/08* (2013.01); *F02C 7/36* (2013.01); *F05D 2250/711* (2013.01); *F05D 2250/712* (2013.01); *F05D 2260/40311* (2013.01); *F16H 2057/085* (2013.01)

(58) Field of Classification Search
CPC ............. F02C 7/36; F05D 2260/40311; F16H 2057/085; F16C 23/041; F16C 23/045
See application file for complete search history.

(56) References Cited

U.S. PATENT DOCUMENTS

| | | | | |
|---|---|---|---|---|
| 2,749,778 A | * | 6/1956 | Walter | ................. F16H 1/2809 74/411 |
| 2,841,456 A | | 7/1958 | Turk | |
| 5,518,319 A | | 5/1996 | Selby | |
| 6,120,187 A | * | 9/2000 | Ono | ........................ F16C 9/04 384/294 |

(Continued)

FOREIGN PATENT DOCUMENTS

| CN | 201396406 Y | * | 2/2010 |
|---|---|---|---|
| CN | 105447295 A | | 3/2016 |

(Continued)

OTHER PUBLICATIONS

German Search Report dated May 19, 2022 from counterpart German Patent Application No. 10 2021 122 450.0.

*Primary Examiner* — Topaz L. Elliott
(74) *Attorney, Agent, or Firm* — SHUTTLEWORTH & INGERSOLL, PLC; Timothy J. Klima

(57) ABSTRACT

The invention concerns a planetary gear box, which has a sun gear, a plurality of planet gears, a ring gear and a plurality of plain bearing pins. Here, a plain bearing pin is arranged in each planet gear, wherein the plain bearing pin and the planet gear form a lubricated plain bearing, and the plain bearing pin forms a crowning at its contact face, wherein the outer diameter of the contact face decreases from a maximum outer diameter towards at least one axial end of the contact face. The crowning of the contact face is configured such that the contact face is concavely shaped adjacent to at least one axial end of the contact face or to a cylindrical region adjoining the axial end.

18 Claims, 8 Drawing Sheets

(56) References Cited

U.S. PATENT DOCUMENTS

| | | | | |
|---|---|---|---|---|
| 6,552,455 | B1* | 4/2003 | Otsuki | F16C 23/041 |
| | | | | 310/90 |
| 8,790,213 | B1* | 7/2014 | Isayama | F16C 33/20 |
| | | | | 475/331 |
| 10,767,755 | B2* | 9/2020 | Nique | F16H 57/08 |
| 10,816,087 | B2* | 10/2020 | Nique | F16H 57/08 |
| 11,085,523 | B2* | 8/2021 | Nique | F16H 57/0479 |
| 2009/0145394 | A1* | 6/2009 | Nigro | F02B 23/0672 |
| | | | | 123/193.6 |
| 2010/0197445 | A1* | 8/2010 | Montestruc | F16H 1/2836 |
| | | | | 475/346 |
| 2016/0341248 | A1* | 11/2016 | Guettler | F16C 23/041 |
| 2019/0162292 | A1* | 5/2019 | Nique | F16H 1/2836 |
| 2019/0162293 | A1* | 5/2019 | Nique | F16H 57/08 |
| 2019/0162294 | A1 | 5/2019 | Nique et al. | |
| 2021/0025477 | A1 | 1/2021 | Goumas | |
| 2021/0254659 | A1 | 8/2021 | Brillon et al. | |

FOREIGN PATENT DOCUMENTS

| | | | | |
|---|---|---|---|---|
| DE | 289318 | A5 * | 4/1991 | ............ F16H 1/46 |
| DE | 102015224912 | A1 | 6/2017 | |
| DE | 102018211161 | A1 | 1/2020 | |
| EP | 1717466 | A2 * | 11/2006 | |
| GB | 2354291 | A * | 3/2001 | |
| JP | 2013204808 | A * | 10/2013 | |
| KR | 20140037616 | A * | 3/2014 | |

\* cited by examiner

PLANETARY GEAR BOX

This application claims priority to German Patent Application 102021122450.0 filed Aug. 31, 2021, the entirety of which is incorporated by reference herein.

The invention concerns a planetary gear box according to the present disclosure and to a gas turbine engine having a planetary gear box of this kind.

There is a known practice of coupling a geared fan engine to a turbine shaft via a planetary gear box, wherein the planetary gear box receives an input from the turbine shaft and outputs drive for the fan so as to drive the fan at a lower rotational speed than the turbine shaft. The planetary gear box comprises planet gears, which are driven by a sun gear and which revolve in a ring gear. Plain bearing pins are arranged in the planet gears, each pin forming a plain bearing with a respective planet gear and being connected to a planet carrier. The planet carrier is coupled to a drive for the fan. Such a planetary gear box is known from US 2019/162294 A1, for example.

It is also known from US 2019/162294 A1 for the contact face of the plain bearing pin to be of crowned form. In this way, an enlarged plain bearing gap, and an associated increased lubricating film thickness, is provided at at least one end of the contact face. This has the effect that, in the event of deformations and vibrations at the ends of the contact face which occur during operation and which are attributable to centrifugal forces and introduced torques, the lubricating film thickness remains large enough to avoid an excessive lubricating film pressure and the risk of metal-on-metal contact.

There is however the problem that the gap height of the plain bearing gap varies over the length of the plain bearing. It is also the case that a crowning of the contact face necessarily results in the planet gear not being optimally supported at the axial ends of the plain bearing pin, which reduces the load capacity of the plain bearing. These effects lead to a situation in which, in the event of a deformation of plain bearing pin and planet gear, despite a crowning of the plain bearing pin, the plain bearing gap and thus the lubricating film thickness run non-uniformly in an axial direction.

The invention is based on the object of providing a planetary gear box that improves the uniformity of the plain bearing gap in the event of a deformation of planet gear and planet pin.

This object is achieved by means of a planetary gear box, a plain bearing pin, and a gas turbine engine having features as disclosed herein. Design embodiments of the invention are set forth in the dependent claims.

Accordingly, in a first inventive aspect, the present invention concerns a planetary gear box which comprises a sun gear, a plurality of planet gears, a ring gear and a plurality of plain bearing pins. The sun gear rotates about a rotation axis of the planetary gear box, which defines an axial direction of the planetary gear box. The plurality of planet gears is driven by the sun gear and engages with the ring gear. The plain bearing pins each have a longitudinal axis and an external contact face. A plain bearing pin is arranged in each planet gear, wherein the plain bearing pin and the planet gear form a lubricated plain bearing. Here, the plain bearing pin forms a crowning at its contact face, wherein the outer diameter of the contact face decreases from a maximum outer diameter towards at least one axial end of the contact face.

It is provided that the crowning of the plain bearing pin is configured such that the contact face is concavely shaped adjacent to at least one axial end of the contact face or to a cylindrical region adjoining the axial end.

Accordingly, the present invention is based on the concept of providing the contact face of the plain bearing pin with a crowning which forms a concave portion adjacent to at least one axial end of the plain bearing pin or to a cylindrical region adjoining said axial end. The formation of a concave portion adjacent to an axial end of the contact face or to a cylindrical region adjoining said axial end is associated with the advantage that a smooth transition is provided from the axial end of the contact face to the region with maximum crowning, because, owing to the concave shape, the outer diameter of the contact face increases only slowly towards the axial centre of the contact face, by contrast to a circular crowning profile such as is known from US 2019/162294 A1.

Furthermore, tests have shown that, at any rate in relevant operating states of the planetary gear box, a deformation of the planet gear occurs in such a way that the inner surface of the planet gear tapers with a convex curvature towards the axial ends, such that, through the combination of a convex portion of the planet gear with a concave portion of the plain bearing pin, towards the axial end of the contact face, a plain bearing gap is formed between the plain bearing pin and the planet gear, the height of which plain bearing gap is substantially constant in an axial direction, such that the uniformity of the plain bearing gap is improved. The invention thus adapts the outer contour of the plain bearing pin to the inner contour of the planet gear that the latter assumes in the loaded operating state, so as to achieve the greatest possible uniformity in the height of the plain bearing gap and thus in the lubricating film thickness during operation. In this way, the robustness and reliability of the bearing and of the planetary gear box are also altogether increased.

It is pointed out that the contact face refers to that region of the plain bearing pin in which the plain bearing acts, that is to say a plain bearing gap is formed between the plain bearing pin and the planet gear. The contact face has two axial ends. Here, the concavely shaped portion of the contact face that is provided according to the invention does not necessarily begin directly at the axial end under consideration, but in design embodiments of the invention may also begin at an axial distance from the axial end. In such a case, the contact face firstly forms a cylindrical region adjacent to the axial end, which cylindrical region is adjoined by the concavely shaped portion of the contact face. Below, where reference is made to a concave shape or a concave portion, no explicit distinction will necessarily be made between these two situations.

One design embodiment of the invention provides that the contact face ends in straight form at the at least one axial end or at the cylindrical region, that is to say assumes an orientation parallel to the longitudinal axis of the plain bearing pin. This design embodiment ensures that the curvature of the contact face is zero at the axial end or cylindrical region, and the outer contour of the plain bearing pin has no edges or discontinuities at the axial end or at the transition to the cylindrical region. This assists in achieving that contact faces which are as far as possible oriented parallel during operation are provided at the axial ends of the plain bearing.

A further design embodiment of the invention provides that the contact face is concavely shaped, forming two concave portions, adjacent to both axial ends or to cylindrical regions of the contact face adjoining said axial ends, and is convexly shaped between the concavely shaped portions. This results in a characteristic shape of the outer surface of the plain bearing pin with two lateral concave portions and an interposed convex portion.

In particular, in this regard, it may be provided that the contact face of the plain bearing pin, in longitudinal section, forms a first concave curve adjacent to one axial end or to the cylindrical region of the contact face, which first concave curve transitions into a convex curve, in the region of which the outer diameter of the contact face is at a maximum, and the convex curve transitions into a second concave curve, which extends as far as the other axial end of the contact face. At the transition from the first concave curve to the convex curve, and at the transition from the convex curve to the second concave curve, the curve forms a respective inflection point. In the context of the invention, longitudinal sections are to be understood to mean longitudinal sections that pass through the longitudinal axis of the plain bearing pin.

One design embodiment in this regard provides that the two concave curves and the convex curve each have a curvature that corresponds to a circular arc. This makes it possible for an outer contour of the contact face to be of circular form in each of the regions under consideration, which simplifies the production of the contact face of the plain bearing pin by cutting processes. However, modern cutting tools also make it possible to produce complex contours, such that the design as a circular arc is to be understood merely as an example.

One design embodiment provides that the contact face is of mirror-symmetrical configuration about its axial centre. In such a case, it is for example provided that the axial portions in which the first concave curve and the second concave curve extend have the same axial length, wherein the convex curve is formed centrally between the two axial ends of the contact face.

A mirror-symmetrical design embodiment of the contact face is however to be understood merely as an example. In alternative exemplary embodiments, it is provided that the plain bearing pin is of asymmetrical configuration about its axial centre. In such a case, it is for example provided that the axial regions in which the first concave curve and the second concave curve extend have different axial lengths.

A further design embodiment of the invention provides that the plain bearing pin has minimum outer diameters at the axial ends of the contact face and the maximum outer diameter between the axial ends. Here, it may be provided that the minimum outer diameters at the two axial ends are identical. However, this is not necessarily the case. Alternatively, the minimum outer diameters at the two axial ends may be different, for example if the two ends are acted on with different loads.

A further design embodiment provides that the maximum of the outer diameter of the plain bearing pin is formed by a circumferential line that extends in a circumferential direction of the plain bearing pin. In the longitudinal section of the plain bearing pin, the maximum thus forms a point. This means that the concave portion of the contact face is configured without a plateau, and is formed in longitudinal section by a continuously curved convex curve.

Alternatively, it may be provided that the maximum of the outer diameter of the contact face is formed by a cylindrical region of constant outer diameter which extends over a defined axial length, wherein such a cylindrical plateau region may be formed centrally or eccentrically. Such a cylindrical region is adjoined by convex regions which transition at least at one axial end into a concave region.

In one design embodiment, it is provided that the plain bearing pin has a maximum of its outer diameter in its axial centre. Alternatively, it may be provided that the plain bearing pin has a maximum of its outer diameter outside its axial centre, and is accordingly of asymmetrical configuration about its axial centre.

A further design embodiment provides that the plain bearing pin is of rotationally symmetrical configuration about the longitudinal axis of the plain bearing pin. However, this is not necessarily the case. In alternative design embodiments, the plain bearing pin has a contact face of crowned configuration only over a circumferential angle of less than 360°. In such a case, the crowned profile of the plain bearing pin extends not over the entire circumference of the plain bearing pin but in a circumferential direction only over a defined angular region. The described positive influence on the plain bearing is also realized in such a design embodiment.

A further design embodiment of the invention provides that the curve formed in longitudinal section by the contact face is an nth degree polynomial function. A polynomial function is defined as follows:

$$f(x) = a_n x^n + a_{n-1} x^{n-1} + \cdots + a_2 x^2 + a_1 x + a_0 = \sum_{k=0}^{n} a_k x^k$$

Such a description of the curve is associated with the advantage that, by changing the individual parameters $a_n$, the curve can be adapted in an effective manner to the given boundary conditions. Symmetrical shaping of the curve can be easily achieved for example by virtue of the parameters of the odd-numbered exponents being set equal to zero. The curve may alternatively be described for example by way of cosine and/or sine functions.

As already observed, the present invention provides that the plain bearing forms a crowning such that, at at least one observed operating point of the planetary gear box, the contact face forms an outer contour that corresponds to an inner contour of the planet gear that the latter forms as a result of its deformation at the at least one observed operating point. Here, tests have shown that the inner contour of the planet gear that arises as a result of a deformation of the planet gear changes only slightly at different operating points, such that a corresponding shape of the plain bearing pin provides a uniform plain bearing gap over a broad operating range.

It is pointed out that the plain bearing pin typically has an axially front end and an axially rear end which are axially spaced apart from the axially front end and the axially rear end of the contact face, wherein the plain bearing pin is connected at its front axial end to an axially front carrier plate and at its rear axial end to an axially rear carrier plate. The plain bearing pin thus extends beyond the contact face at both ends, and is connected there in each case to a carrier plate. A distinction is thus to be made between the axial ends of the contact face and the axial ends of the plain bearing pin.

One design embodiment of the invention provides that each planet gear forms, on its axially front face side and/or on its axially rear face side, a cutout that extends within the planet gear proceeding from the face side. This influences the stiffness of the planet gear and makes it possible, in the presence of high forces acting at the ends of the plain bearing, for that contact face of the plain bearing which is formed by the planet gear to deform flexibly at its ends, whereby an excessive lubricating film pressure is avoided.

According to a further aspect of the invention, the present invention relates to a plain bearing pin, in particular for a planetary gear box, which plain bearing pin has an external contact face for a plain bearing, wherein the contact face has an axially front end and an axially rear end, and wherein the plain bearing pin forms a crowning at its contact face, in the case of which the outer diameter of the contact face decreases from a maximum outer diameter towards at least one axial end of the contact face. It is provided here that the crowning of the contact face is configured such that the contact face is concavely shaped adjacent to at least one axial end of the contact face or to a cylindrical region adjoining the axial end.

The advantages and embodiments explained in the context of the planetary gear box according to the invention also apply in an analogous manner to the plain bearing pin according to the invention.

The invention also relates to a gas turbine engine for an aircraft, which has:
- an engine core comprising a turbine, a compressor, and a turbine shaft connecting the turbine to the compressor;
- a fan, which is positioned upstream of the engine core, wherein the fan comprises a plurality of fan blades and is driven by a fan shaft; and
- a planetary gear box according to the present disclosure, the input of which is connected to the turbine shaft and the output of which is connected to the fan shaft.

One design embodiment in this regard may provide that
- the turbine is a first turbine, the compressor is a first compressor, and the turbine shaft is a first turbine shaft;
- the engine core further comprises a second turbine, a second compressor, and a second turbine shaft which connects the second turbine to the second compressor; and
- the second turbine, the second compressor, and the second turbine shaft are arranged so as to rotate at a higher rotational speed than the first turbine shaft.

It is pointed out that the present invention is described with reference to a cylindrical coordinate system which has the coordinates x, r, and φ. Here, x indicates the axial direction, r indicates the radial direction, and φ indicates the angle in a circumferential direction. Here, the axial direction is identical to the engine axis of the gas turbine engine in which the planetary gear box is contained, wherein the axial direction points from the engine inlet in the direction of the engine outlet. Proceeding from the x-axis, the radial direction points radially outwards. Terms such as "in front of", "behind", "front", and "rear" relate to the axial direction, or the flow direction in the engine. Terms such as "outer" or "inner" relate to the radial direction.

As noted elsewhere herein, the present disclosure may relate to a gas turbine engine. Such a gas turbine engine may comprise an engine core which comprises a turbine, a combustion chamber, a compressor, and a core shaft that connects the turbine to the compressor. Such a gas turbine engine may comprise a fan (having fan blades) which is positioned upstream of the engine core.

Arrangements of the present disclosure can be particularly, although not exclusively, beneficial for fans that are driven via a gear box. Accordingly, the gas turbine engine may comprise a gear box that receives an input from the core shaft and outputs drive for the fan so as to drive the fan at a lower rotational speed than the core shaft. The input to the gear box may be performed directly from the core shaft or indirectly from the core shaft, for example via a spur shaft and/or a spur gear. The core shaft may be rigidly connected to the turbine and the compressor, such that the turbine and the compressor rotate at the same rotational speed (wherein the fan rotates at a lower rotational speed).

The gas turbine engine as described and/or claimed herein may have any suitable general architecture. For example, the gas turbine engine may have any desired number of shafts, for example one, two or three shafts, that connect turbines and compressors. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft which connects the second turbine to the second compressor. The second turbine, the second compressor and the second core shaft may be arranged so as to rotate at a higher rotational speed than the first core shaft.

In such an arrangement, the second compressor may be positioned so as to be axially downstream of the first compressor. The second compressor may be arranged so as to receive (for example directly receive, for example via a generally annular duct) flow from the first compressor.

The gear box may be arranged so as to be driven by that core shaft (for example the first core shaft in the example above) which is configured to rotate (for example during use) at the lowest rotational speed. For example, the gear box may be arranged so as to be driven only by the core shaft (for example only by the first core shaft, and not the second core shaft, in the example above) that is configured to rotate (for example during use) at the lowest rotational speed. Alternatively thereto, the gear box may be arranged so as to be driven by one or a plurality of shafts, for example the first and/or the second shaft in the example above.

In the case of a gas turbine engine as described and/or claimed herein, a combustion chamber may be provided axially downstream of the fan and of the compressor(s). For example, the combustion chamber may lie directly downstream of the second compressor (for example at the exit of the latter), when a second compressor is provided. By way of a further example, the flow at the exit of the compressor may be fed to the inlet of the second turbine, when a second turbine is provided. The combustion chamber may be provided upstream of the turbine(s).

The or each compressor (for example the first compressor and the second compressor as described above) may comprise any number of stages, for example multiple stages. Each stage may comprise a row of rotor blades and a row of stator blades, which may be variable stator blades (in the sense that their angle of incidence may be variable). The row of rotor blades and the row of stator blades may be axially offset from one another.

The or each turbine (for example the first turbine and the second turbine as described above) may comprise any number of stages, for example multiple stages. Each stage may comprise a row of rotor blades and a row of stator blades. The row of rotor blades and the row of stator blades may be axially offset from one another.

Each fan blade may be defined as having a radial span extending from a root (or a hub) at a radially inner location flowed over by gas, or at a 0% span width position, to a tip at a 100% span width position. The ratio of the radius of the fan blade at the hub to the radius of the fan blade at the tip may be less than (or of the order of magnitude of): 0.4, 0.39, 0.38, 0.37, 0.36, 0.35, 0.34, 0.33, 0.32, 0.31, 0.3, 0.29, 0.28, 0.27, 0.26 or 0.25. The ratio of the radius of the fan blade at the hub to the radius of the fan blade at the tip may be in an inclusive range delimited by two of the values in the previous sentence (that is to say that the values may form upper or lower limits). These ratios can commonly be referred to as the hub-to-tip ratio. The radius at the hub and the radius at the tip can both be measured at the leading periphery part (or the axially frontmost periphery) of the blade. The hub-to-tip ratio refers, of course, to that portion of the fan blade which is flowed over by gas, that is to say the portion that is situated radially outside any platform.

The radius of the fan can be measured between the engine centreline and the tip of the fan blade at the leading periphery of the latter. The diameter of the fan (which can simply be double the radius of the fan) may be larger than (or of the order of magnitude of): 250 cm (approximately 100 inches), 260 cm, 270 cm (approximately 105 inches), 280 cm (approximately 110 inches), 290 cm (approximately 115 inches), 300 cm (approximately 120 inches), 310 cm, 320 cm (approximately 125 inches), 330 cm (approximately 130 inches), 340 cm (approximately 135 inches), 350 cm, 360 cm (approximately 140 inches), 370 cm (approximately 145 inches), 380 cm (approximately 150 inches), or 390 cm (approximately 155 inches). The fan diameter may be in an inclusive range delimited by two of the values in the previous sentence (that is to say that the values may form upper or lower limits).

The rotational speed of the fan may vary during use. Generally, the rotational speed is lower for fans with a comparatively large diameter. Purely by way of a non-limiting example, the rotational speed of the fan under cruise conditions may be less than 2500 rpm, for example less than 2300 rpm. Purely by way of a further non-limiting example, the rotational speed of the fan under cruise conditions for an engine having a fan diameter in the range from 250 cm to 300 cm (for example 250 cm to 280 cm) may also be in the range from 1700 rpm to 2500 rpm, for example in the range from 1800 rpm to 2300 rpm, for example in the range from 1900 rpm to 2100 rpm. Purely by way of a further non-limiting example, the rotational speed of the fan under cruise conditions for an engine having a fan diameter in the range from 320 cm to 380 cm may be in the range from 1200 rpm to 2000 rpm, for example in the range from 1300 rpm to 1800 rpm, for example in the range from 1400 rpm to 1600 rpm.

During use of the gas turbine engine, the fan (with associated fan blades) rotates about a rotation axis. This rotation results in the tip of the fan blade moving with a velocity $U_{tip}$. The work done by the fan blades on the flow results in an enthalpy rise dH in the flow. A fan tip loading can be defined as $dH/U_{tip}^2$, where dH is the enthalpy rise (for example the 1-D average enthalpy rise) across the fan and $U_{tip}$ is the (translational) velocity of the fan tip, for example at the leading periphery of the tip (which can be defined as the fan tip radius at the leading periphery multiplied by the angular velocity). The fan tip loading under cruise conditions may be more than (or of the order of magnitude of): 0.3, 0.31, 0.32, 0.33, 0.34, 0.35, 0.36, 0.37, 0.38, 0.39, or 0.4 (wherein all units in this passage are $Jkg^{-1}K^{-1}/(ms^{-1})^2$). The fan tip loading may be in an inclusive range delimited by two of the values in the previous sentence (that is to say that the values may form upper or lower limits).

Gas turbine engines in accordance with the present disclosure may have any desired bypass ratio, wherein the bypass ratio is defined as the ratio of the mass flow rate of the flow through the bypass duct to the mass flow rate of the flow through the core under cruise conditions. In the case of some arrangements, the bypass ratio may be more than (or of the order of magnitude of): 10, 10.5, 11, 11.5, 12, 12.5, 13, 13.5, 14, 14.5, 15, 15.5, 16, 16.5, or 17. The bypass ratio may be in an inclusive range delimited by two of the values in the previous sentence (that is to say that the values may form upper or lower limits). The bypass duct may be substantially annular. The bypass duct may be situated radially outside the engine core. The radially outer surface of the bypass duct may be defined by an engine nacelle and/or a fan casing.

The overall pressure ratio of a gas turbine engine as described and/or claimed herein can be defined as the ratio of the stagnation pressure upstream of the fan to the stagnation pressure at the exit of the highest pressure compressor (before entry into the combustion chamber). By way of a non-limiting example, the overall pressure ratio of a gas turbine engine as described and/or claimed herein at cruising speed may be greater than (or of the order of magnitude of): 35, 40, 45, 50, 55, 60, 65, 70, 75. The overall pressure ratio may be in an inclusive range delimited by two of the values in the previous sentence (that is to say that the values may form upper or lower limits).

The specific thrust of an engine may be defined as the net thrust of the engine divided by the total mass flow through the engine. The specific thrust of an engine as described and/or claimed herein under cruise conditions may be less than (or of the order of magnitude of): 110 $Nkg^{-1}s$, 105 $Nkg^{-1}s$, 100 $Nkg^{-1}s$, 95 $Nkg^{-1}s$, 90 $Nkg^{-1}s$, 85 $Nkg^{-1}s$ or 80 $Nkg^{-1}s$. The specific thrust may be in an inclusive range delimited by two of the values in the previous sentence (that is to say that the values may form upper or lower limits). Such engines can be particularly efficient in comparison with conventional gas turbine engines.

A gas turbine engine as described and/or claimed herein may have any desired maximum thrust. Purely by way of a non-limiting example, a gas turbine as described and/or claimed herein may be capable of generating a maximum thrust of at least (or of the order of magnitude of): 160 kN, 170 kN, 180 kN, 190 kN, 200 kN, 250 kN, 300 kN, 350 kN, 400 kN, 450 kN, 500 kN, or 550 kN. The maximum thrust may be in an inclusive range delimited by two of the values in the previous sentence (that is to say that the values may form upper or lower limits). The thrust referred to above may be the maximum net thrust at standard atmospheric conditions at sea level plus 15 degrees C. (ambient pressure 101.3 kPa, temperature 30 degrees C.) in the case of a static engine.

During use, the temperature of the flow at the entry to the high-pressure turbine can be particularly high. This temperature, which can be referred to as TET, may be measured at the exit to the combustion chamber, for example directly upstream of the first turbine blade, which in turn can be referred to as a nozzle guide vane. At cruising speed, the TET may be at least (or of the order of magnitude of): 1400 K, 1450 K, 1500 K, 1550 K, 1600 K, or 1650 K. The TET at cruising speed may be in an inclusive range delimited by two of the values in the previous sentence (that is to say that the values may form upper or lower limits). The maximum TET during use of the engine may for example be at least (or of the order of magnitude of): 1700 K, 1750 K, 1800 K, 1850 K, 1900 K, 1950 K, or 2000 K. The maximum TET may be in an inclusive range delimited by two of the values in the previous sentence (that is to say that the values may form upper or lower limits). The maximum TET may occur, for example, under a high thrust condition, for example under a maximum take-off thrust (MTO) condition.

A fan blade and/or an aerofoil portion of a fan blade described and/or claimed herein may be manufactured from any suitable material or a combination of materials. For example, at least a part of the fan blade and/or of the aerofoil may be manufactured at least in part from a composite, for example a metal matrix composite and/or an organic matrix composite, such as carbon fibre. By way of a further example, at least a part of the fan blade and/or of the aerofoil may be manufactured at least in part from a metal, such as a titanium-based metal or an aluminium-based material (such as an aluminium-lithium alloy) or a steel-based material. The fan blade may comprise at least two regions which are manufactured using different materials. For example, the fan blade may have a protective leading periphery, which is manufactured using a material that is better able to resist impact (for example of birds, ice, or other material) than the rest of the blade. Such a leading periphery may, for example, be manufactured using titanium or a titanium-based alloy. Thus, purely by way of example, the fan blade may have a carbon-fibre-based or aluminium-based body (such as an aluminium-lithium alloy) with a titanium leading periphery.

A fan as described and/or claimed herein may comprise a central portion, from which the fan blades may extend, for example in a radial direction. The fan blades may be attached to the central portion in any desired manner. For example, each fan blade may comprise a fixing device which can engage with a corresponding slot in the hub (or disk). Purely by way of example, such a fixing device may be in the form of a dovetail that can be inserted into and/or engage with a corresponding slot in the hub/disk in order for the fan blade to be fixed to the hub/disk. By way of a further example, the fan blades may be formed integrally with a central portion. Such an arrangement may be referred to as a blisk or a bling. Any suitable method may be used to produce such a blisk or such a bling. For example, at least some of the fan blades may be machined from a block and/or at least some of the fan blades may be attached to the hub/disk by welding, such as linear friction welding, for example.

The gas turbine engines described and/or claimed herein may or may not be provided with a variable area nozzle (VAN). Such a variable area nozzle can allow the exit cross section of the bypass duct to be varied during use. The general principles of the present disclosure can apply to engines with or without a VAN.

The fan of a gas turbine as described and/or claimed herein may have any desired number of fan blades, for example 16, 18, 20 or 22 fan blades.

As used herein, cruise conditions can mean cruise conditions of an aircraft to which the gas turbine engine is attached. Such cruise conditions can be conventionally defined as the conditions during the middle part of the flight, for example the conditions experienced by the aircraft and/or the engine between (in terms of time and/or distance) the top of climb and the start of descent.

Purely by way of an example, the forward speed under the cruise condition may be any point in the range of from Mach 0.7 to 0.9, for example 0.75 to 0.85, for example 0.76 to 0.84, for example 0.77 to 0.83, for example 0.78 to 0.82, for example 0.79 to 0.81, for example of the order of magnitude of Mach 0.8, of the order of magnitude of Mach 0.85 or in the range of from 0.8 to 0.85. Any arbitrary speed within these ranges can be the constant cruise condition. In the case of some aircraft, the constant cruise conditions may be outside these ranges, for example below Mach 0.7 or above Mach 0.9.

Purely by way of example, the cruise conditions may correspond to standard atmospheric conditions at an altitude that is in the range from 10,000 m to 15,000 m, for example in the range from 10,000 m to 12,000 m, for example in the range from 10,400 m to 11,600 m (around 38,000 ft), for example in the range from 10,500 m to 11,500 m, for example in the range from 10,600 m to 11,400 m, for example in the range from 10,700 m (around 35,000 ft) to 11,300 m, for example in the range from 10,800 m to 11,200 m, for example in the range from 10,900 m to 11,100 m, for example of the order of 11,000 m. The cruise conditions may correspond to standard atmospheric conditions at any given altitude in these ranges.

Purely by way of example, the cruise conditions may correspond to the following: a forward Mach number of 0.8; a pressure of 23,000 Pa; and a temperature of −55 degrees C.

As used anywhere herein, "cruising speed" or "cruise conditions" may mean the aerodynamic design point. Such an aerodynamic design point (or ADP) may correspond to the conditions (including, for example, the Mach number, environmental conditions, and thrust requirement) for which the fan operation is designed. This may mean, for example, the conditions under which the fan (or the gas turbine engine) has the optimum efficiency in terms of construction.

During use, a gas turbine engine described and/or claimed herein may be operated under the cruise conditions defined elsewhere herein. Such cruise conditions may be determined by the cruise conditions (for example the conditions during the middle part of the flight) of an aircraft to which at least one (for example 2 or 4) gas turbine engine(s) can be fastened in order to provide thrust force.

It is self-evident to a person skilled in the art that a feature or parameter described in relation to one of the above aspects may be applied to any other aspect, unless these are mutually exclusive. Furthermore, any feature or any parameter described here may be applied to any aspect and/or combined with any other feature or parameter described here, unless these are mutually exclusive.

The invention will be explained in more detail below on the basis of a plurality of exemplary embodiments with reference to the figures of the drawing. In the drawings.

Figure 1:
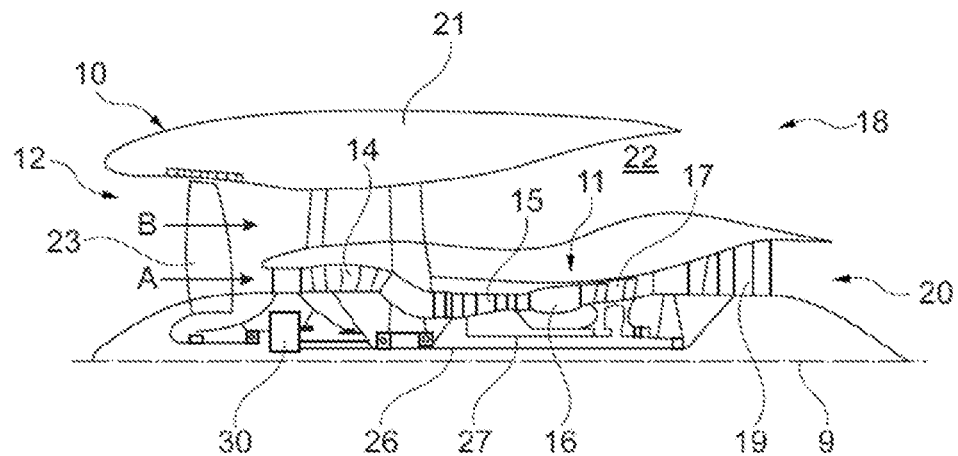
FIG. 1 shows a lateral sectional view of a gas turbine engine.

FIG. 1 illustrates a gas turbine engine 10 having a main rotation axis 9. The engine 10 comprises an air intake 12 and a thrust fan 23 that generates two air flows: a core air flow A and a bypass air flow B. The gas turbine engine 10 comprises a core 11 which receives the core air flow A. In the sequence of axial flow, the engine core 11 comprises a low-pressure compressor 14, a high-pressure compressor 15, a combustion device 16, a high-pressure turbine 17, a low-pressure turbine 19, and a core thrust nozzle 20. An engine nacelle 21 surrounds the gas turbine engine 10 and defines a bypass duct 22 and a bypass thrust nozzle 18. The bypass air flow B flows through the bypass duct 22. The fan 23 is attached to and driven by the low-pressure turbine 19 by way of a shaft 26 and an epicyclic gear box 30.

During use, the core air flow A is accelerated and compressed by the low-pressure compressor 14 and directed into the high-pressure compressor 15, where further compression takes place. The compressed air expelled from the high-pressure compressor 15 is directed into the combustion device 16, where it is mixed with fuel and the mixture is combusted. The resulting hot combustion products then propagate through the high-pressure and low-pressure turbines 17, 19 and thereby drive said turbines, before being expelled through the nozzle 20 to provide a certain thrust force. The high-pressure turbine 17 drives the high-pressure compressor 15 by means of a suitable connecting shaft 27. The fan 23 generally provides the major part of the thrust force. The epicyclic gear box 30 is a reduction gear box.

Figure 2:
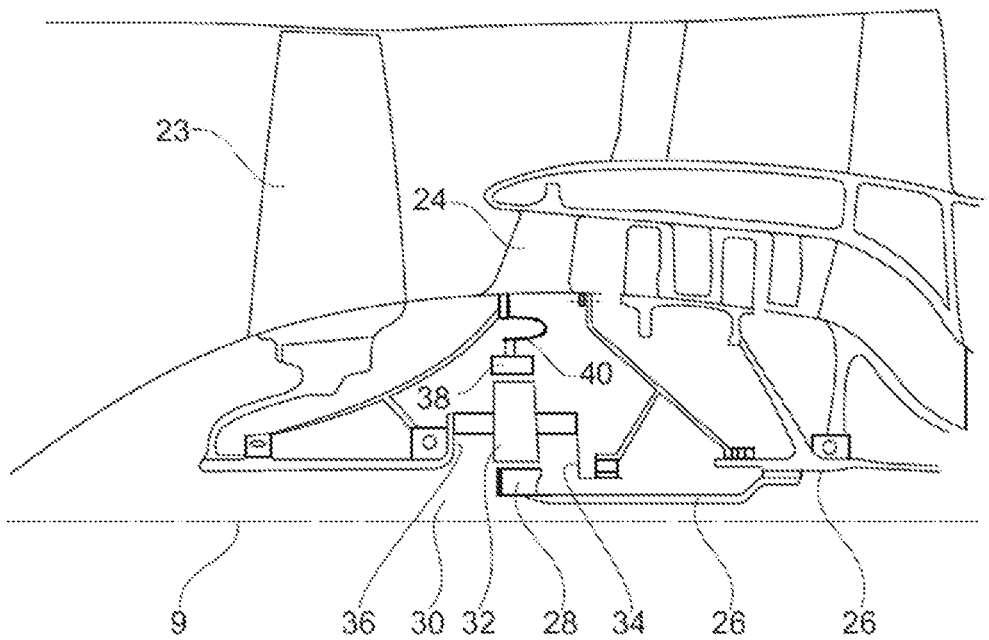
FIG. 2 shows a close-up lateral sectional view of an upstream portion of a gas turbine engine.

An exemplary arrangement for a geared fan gas turbine engine 10 is shown in FIG. 2. The low-pressure turbine 19 (see FIG. 1) drives the shaft 26 which is coupled to a sun gear 28 of the epicyclic gear box assembly 30. Multiple planet gears 32, which are coupled to one another by a planet carrier 34, are situated radially to the outside of the sun gear 28 and mesh therewith. The planet carrier 34 limits the planet gears 32 to orbiting about the sun gear 28 in a synchronous manner while enabling each planet gear 32 to rotate about its own axis. The planet carrier 34 is coupled by way of linkages 36 to the fan 23 so as to drive the rotation of the latter about the engine axis 9. Radially to the outside of the planet gears 32 and meshing therewith is an annulus or ring gear 38 that is coupled, via linkages 40, to a stationary support structure 24.

It is noted that the terms "low-pressure turbine" and "low-pressure compressor" as used herein can be taken to mean the lowest-pressure turbine stage and the lowest-pressure compressor stage (that is to say not including the fan 23) respectively and/or the turbine and compressor stages that are connected to one another by the connecting shaft 26 with the lowest rotational speed in the engine (that is to say not including the gear box output shaft that drives the fan 23). In some documents, the "low-pressure turbine" and the "low-pressure compressor" referred to herein may alternatively be known as the "intermediate-pressure turbine" and "intermediate-pressure compressor". Where such alternative nomenclature is used, the fan 23 can be referred to as a first compression stage or lowest-pressure compression stage.

Figure 3:
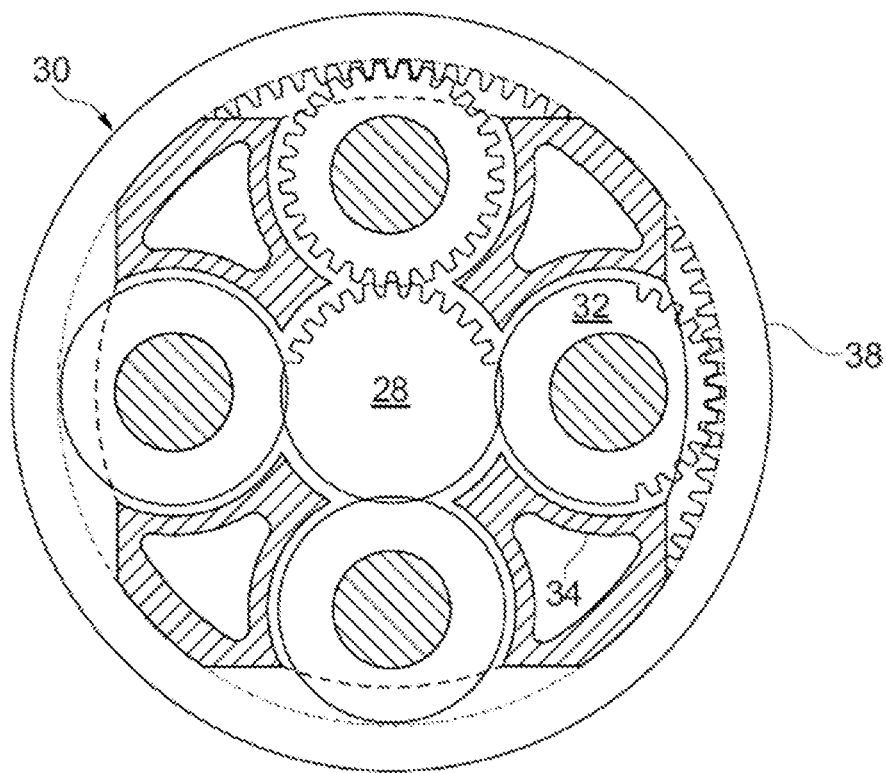
FIG. 3 shows a partially cut-away view of a gear box for a gas turbine engine.

The epicyclic gear box 30 is shown in an exemplary manner in greater detail in FIG. 3. Each of the sun gear 28, the planet gears 32 and the ring gear 38 comprise teeth about their periphery for meshing with the other toothed gears. However, for clarity, only exemplary portions of the teeth are illustrated in FIG. 3. Although four planet gears 32 are illustrated, it will be apparent to a person skilled in the art that more or fewer planet gears 32 may be provided within the scope of protection of the claimed invention. Practical applications of an epicyclic gear box 30 generally comprise at least three planet gears 32.

The epicyclic gear box 30 illustrated by way of example in FIGS. 2 and 3 is a planetary gear box, in which the planet carrier 34 is coupled to an output shaft via linkages 36, wherein the ring gear 38 is fixed. However, any other suitable type of epicyclic gear box 30 can be used. By way of further example, the epicyclic gear box 30 can be a star arrangement, in which the planet carrier 34 is held so as to be fixed, wherein the ring gear (or annulus) 38 is allowed to rotate. In the case of such an arrangement, the fan 23 is driven by the ring gear 38. As a further alternative example, the gear box 30 may be a differential gear box in which both the ring gear 38 and the planet carrier 34 are allowed to rotate.

It is self-evident that the arrangement shown in FIGS. 2 and 3 is merely an example, and various alternatives fall within the scope of protection of the present disclosure. Purely by way of example, any suitable arrangement can be used for positioning the gear box 30 in the engine 10 and/or for connecting the gear box 30 to the engine 10. By way of a further example, the connections (such as the linkages 36, 40 in the example of FIG. 2) between the gear box 30 and other parts of the engine 10 (such as the input shaft 26, the output shaft and the fixed structure 24) may have a certain degree of stiffness or flexibility. By way of a further example, any suitable arrangement of the bearings between rotating and stationary parts of the engine (for example between the input and output shafts of the gear box and the fixed structures, such as the gear box housing) may be used, and the disclosure is not limited to the exemplary arrangement of FIG. 2. For example, where the gear box 30 has a star arrangement (described above), the person skilled in the art would readily understand that the arrangement of output and support linkages and bearing positions would typically be different to that shown by way of example in FIG. 2.

Accordingly, the present disclosure extends to a gas turbine engine having an arbitrary arrangement of gear box types (for example star-shaped or planetary), support structures, input and output shaft arrangement, and bearing positions.

Optionally, the gear box may drive additional and/or alternative components (for example the intermediate-pressure compressor and/or a booster compressor).

Other gas turbine engines in which the present disclosure can be used may have alternative configurations. For example, such engines may have an alternative number of compressors and/or turbines and/or an alternative number of connecting shafts. As a further example, the gas turbine engine shown in FIG. 1 has a split flow nozzle 20, 22, which means that the flow through the bypass duct 22 has its own nozzle, which is separate from the engine core nozzle 20 and is radially outside the latter. However, this is not restrictive, and any aspect of the present disclosure can also apply to engines in which the flow through the bypass duct 22 and the flow through the core 11 are mixed or combined before (or upstream of) a single nozzle, which may be referred to as a mixed flow nozzle. One or both nozzles (whether mixed or split flow) can have a fixed or variable region. Although the example described relates to a turbofan engine, the disclosure can be applied, for example, to any type of gas turbine engine, such as, for example, an open rotor engine (in which the fan stage is not surrounded by an engine nacelle) or a turboprop engine. In some arrangements, the gas turbine engine 10 potentially does not comprise a gear box 30.

The geometry of the gas turbine engine 10, and components thereof, is/are defined by a conventional axis system, which comprises an axial direction (which is aligned with the rotation axis 9), a radial direction (in the direction from bottom to top in FIG. 1), and a circumferential direction (perpendicular to the view in FIG. 1). The axial, radial and circumferential directions are perpendicular to one another.

Figure 4:
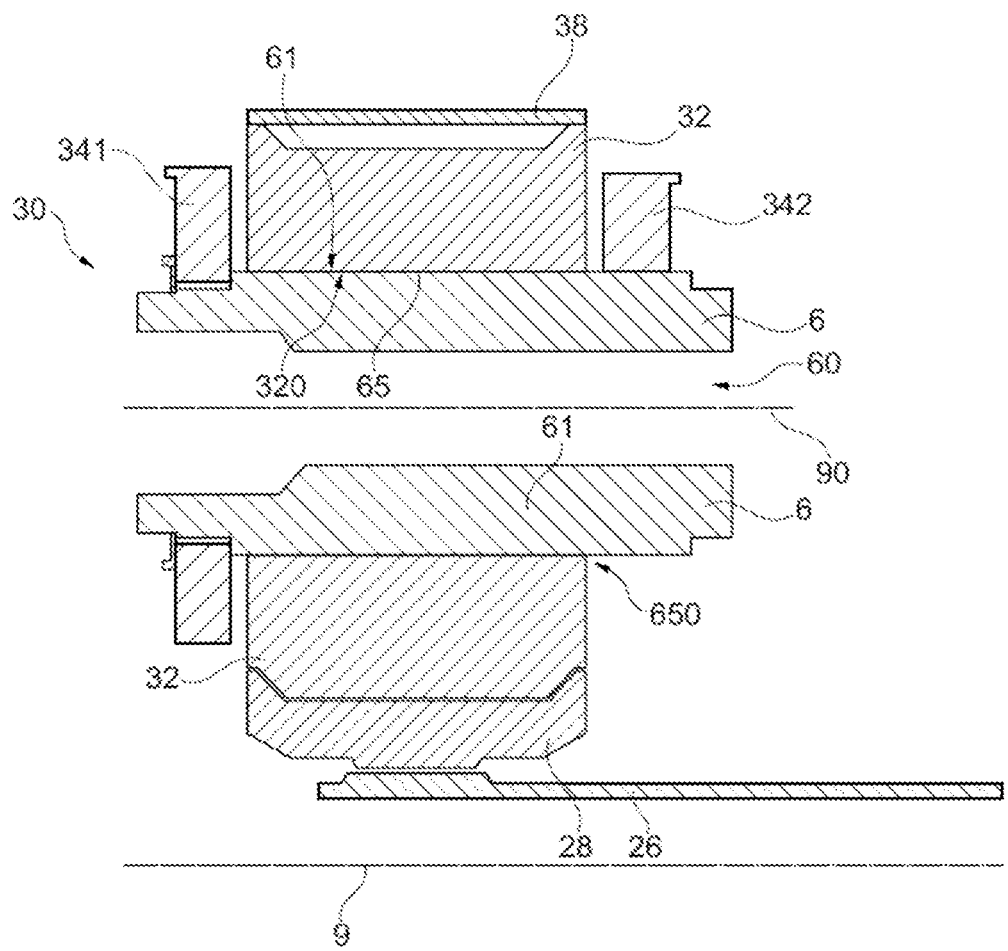
FIG. 4 shows a sectional illustration of elements of a planetary gear box which is suitable for use in a gas turbine engine according to FIG. 1.

For better understanding of the background of the invention, a planetary gear box known from the prior art is explained in more detail with reference to FIG. 4. FIG. 4 shows a sectional illustration of an exemplary embodiment of a planetary gear box 30 of a gas turbine engine configured as a geared fan engine as shown in FIG. 1. The planetary gear box 30 comprises a sun gear 28 which is driven by a drive shaft 26 or sun shaft. The drive shaft 26 is the shaft 26 in FIGS. 1 and 2 or, more generally, a turbine shaft. The sun gear 28 and the drive shaft 26 here rotate about the rotation axis 9. The rotation axis of the planetary gear box 30 is identical to the rotation axis 9 or engine axis of the gas turbine engine 10.

The planetary gear box 30 furthermore comprises a plurality of planet gears 32, one of which is illustrated in the sectional illustration in FIG. 4. The sun gear 28 drives the plurality of planet gears 32, wherein a toothing of the sun gear 28 is in engagement with a toothing of the planet gear 32.

The planet gear 32 is of hollow cylindrical design and forms an outer lateral surface and an inner lateral surface. Driven by the sun gear 28, the planet gear 32 rotates about a rotation axis 90, which is parallel to the rotation axis 9. The outer circumferential surface of the planet gear 32 forms a toothing which is in engagement with the toothing of a ring gear 38. The ring gear 38 is arranged in a fixed manner, i.e. in such a way that it does not rotate. However, it is pointed out that the present invention is not restricted to planetary gear boxes with a stationary ring gear. It can likewise be implemented in planetary gear boxes with a stationary planet carrier and a rotating ring gear.

Owing to their coupling with the sun gear 28, the planet gears 32 rotate and, in so doing, move along the circumference of the ring gear 38. The rotation of the planet gears 32 along the circumference of the ring gear 38 and simultaneously about the rotation axis 90 is slower than the rotation of the drive shaft 26, thereby providing a reduction ratio.

Adjoining its inner lateral surface, the planet gear 32 has a centred axial opening. A plain bearing pin 6, which itself also has an axial bore 60, is incorporated in the opening, wherein the longitudinal axis of the bore is identical to the rotation axis 90 of the planet gear 32. The plain bearing pin 6 and the planet gear 32 form a plain bearing 65 at their mutually facing surfaces. The plain bearing pin 6 is also called a planet pin, planet gear pin or planet gear bearing pin.

The mutually facing surfaces of the plain bearing pin 6 and the planet gear 32 are an at least approximately cylindrical, external contact face or outer face 61 of the plain bearing pin 6 and an at least approximately cylindrical inner face 320 of the planet gear 32. These surfaces form the running surfaces of the plain bearing. Lubricating oil is present between the running surfaces 61, 320, which in the event of rotation builds up a hydrodynamic lubricant film which separates the running surfaces from one another. Here the plain bearing forms a plain bearing gap 650 between the running surfaces 61, 320. The height of the plain bearing gap 650, which is a radial height, in this case varies in a circumferential direction. The height of the plain bearing gap 650 defines the lubricant film thickness of the oil. The smaller the lubricant film thickness, the greater the lubricant film pressure and the greater the temperature development in the lubricant film or oil.

It is pointed out that the plain bearing pin 6 may have a stiffness which varies over its axial length, for example by means of different wall thicknesses, as described in US 2021/025477 A1. Moreover, the design of the plain bearing pin 6 with an axial bore 60 should be considered merely exemplary. It may alternatively be provided that the plain bearing pin 6 has no axial bore and is solid.

FIG. 4 furthermore shows a front carrier plate 341 and a rear carrier plate 342, which are constituent parts of the planet carrier 34, cf. FIG. 2. The planet gear pin 6 is fixedly connected to the front carrier plate 341 and to the rear carrier plate 342. The front carrier plate 341 is for example connected to a torque-transmitting member, which is coupled to a fan shaft.

To lubricate the bearing 65 between the plain bearing pin 6 and the planet gear 32, one or more oil supply systems are provided, which comprise oil feed channels (not shown) which each terminate in an oil feed pocket (not shown) formed on or machined into the outer contact face 61 of the plain bearing pin 6. Oil from a circulating oil system is conducted into the feed pockets in the plain bearing pin 6 via the oil feed channels. The oil is supplied for example via the axial inner bore 60 of the plain bearing pin 6.

In the context of the present invention, the design of the plain bearing pin with regard to a uniform distribution of the lubricating oil in the plain bearing gap is of importance. While the principles of the present invention have been described with reference to plain bearings in a planetary gear box of a gas turbine engine, said principles basically apply to plain bearing pins for any plain bearings and gear boxes.

Figure 5:
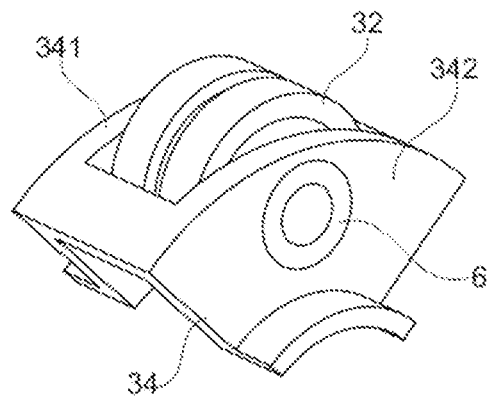
FIG. 5 shows a perspective view of a sub-portion of a planetary gear box, illustrating a planet gear mounted on a plain bearing pin, wherein the plain bearing pin is connected to a planet carrier.
Figure 6:
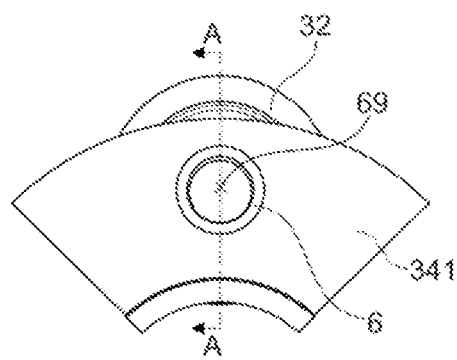
FIG. 6 shows a view of the sub-portion of FIG. 5 from the front.

FIG. 5 shows a perspective view of a detail of a planetary gear box according to FIG. 4. To be seen here is a planet gear 32 which is mounted on a plain bearing pin 6, forming a plain bearing. The plain bearing pin 6 is, at its two face sides, connected to an axially front carrier plate 341 and an axially rear carrier plate 342 of a planet carrier 34, for example by way of an interference fit. FIG. 6 shows a detail of the planetary gear box according to FIG. 5 in a face-side view. Also illustrated here is a longitudinal axis 69 of the plain bearing pin 6, which defines an axial direction of the plain bearing pin 6. When the planetary gear box is not in operation, the longitudinal axis 69 of the plain bearing pin 6 and the rotation axis 90 of the planet gear 32 (cf. FIG. 4) are identical.

Figure 7:
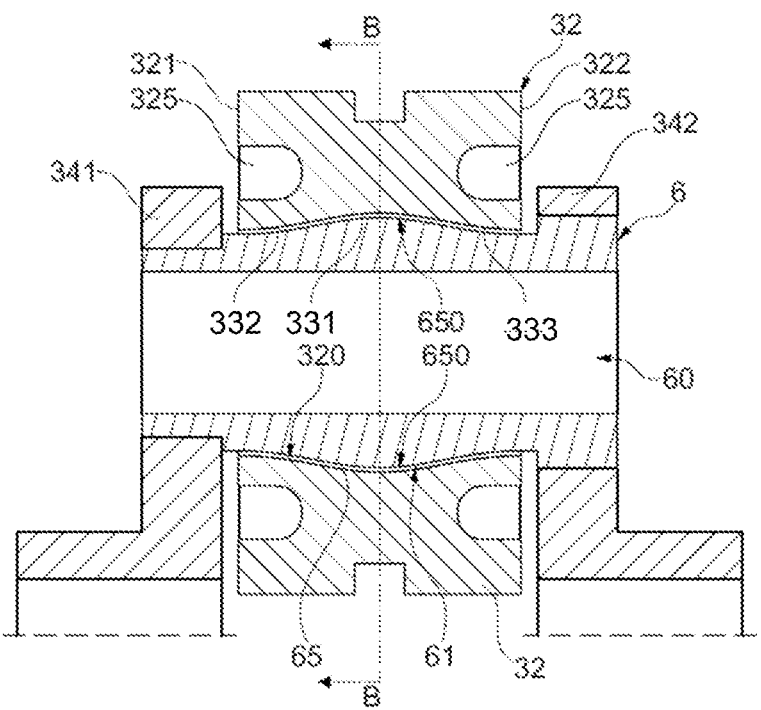
FIG. 7 shows a sectional view of the sub-portion along the line A-A in FIG. 6.

FIG. 7 shows the observed detail of the planetary gear box in a sectional view along the line A-A in FIG. 6. The illustration substantially corresponds to the illustration of FIG. 4, wherein the sun gear and the ring gear are not illustrated. The planet gear 32 is configured so as to form two face-side cutouts 325 that extend within the planet gear 32 proceeding from the respective face side 321, 322. Such shaping of the planet gear 32 reduces the stiffness of the planet gear at the axial face sides 321, 322 and thus makes it possible, in the presence of high forces acting at the ends of the plain bearing, for that contact face of the plain bearing which is formed by the planet gear 32 to deform in a flexible manner at its ends. Such a design is however optional.

According to FIG. 7, the plain bearing pin 6 has a specially configured crowning at its contact face 61. Crowning refers here to a shaping in the case of which the outer diameter of the contact face 61 decreases, from a maximum outer diameter, towards at least one of the axial ends of the contact face 61. The plain bearing pin 6 of FIG. 7 thus has a maximum outer diameter in the axial centre of the plain bearing pin 6. The portion in which the plain bearing pin 6 forms the maximum outer diameter is convexly shaped. This is adjoined by two concavely shaped portions, which extend as far as the axial ends of the contact face 61 and end there in straight form, as will be discussed in detail on the basis of FIG. 10.

It is pointed out that the extent of the crowning is not illustrated true to scale, and is illustrated in exaggerated form, in FIG. 7 and the other figures for illustrative purposes.

FIG. 7 shows the planetary gear box during operation. During operation, the planet gear 32 is deformed, wherein the deformation experienced by the planet gear 32 in an observed operating state is substantially constant. The deformation has the effect in particular that the inner surface 320 of the planet gear 32, which forms one running surface of the plain bearing, has a concave depression in the axially central portion 331, which depression tapers off into convexly shaped portions 332, 333 towards the axial ends. Here, tests have shown that such shaping of the planet gear 32 is substantially unchanged over broad ranges of operation.

The outer contouring of the plain bearing pin 6 at its contact face 61 is such that it follows the inner contour, formed by the inner surface 320, of the planet gear 32. Accordingly, the plain bearing pin 6 forms a concave portion in the axial region in which the planet gear 32 forms the concave portion 331. The plain bearing pin forms concave portions in the edge regions of the plain bearing pin, in which the planet gear has convexly shaped portions 332, 333 at its inner side. This results overall in a plain bearing gap 650 whose gap height is substantially constant over the length of the plain bearing.

Figure 9:
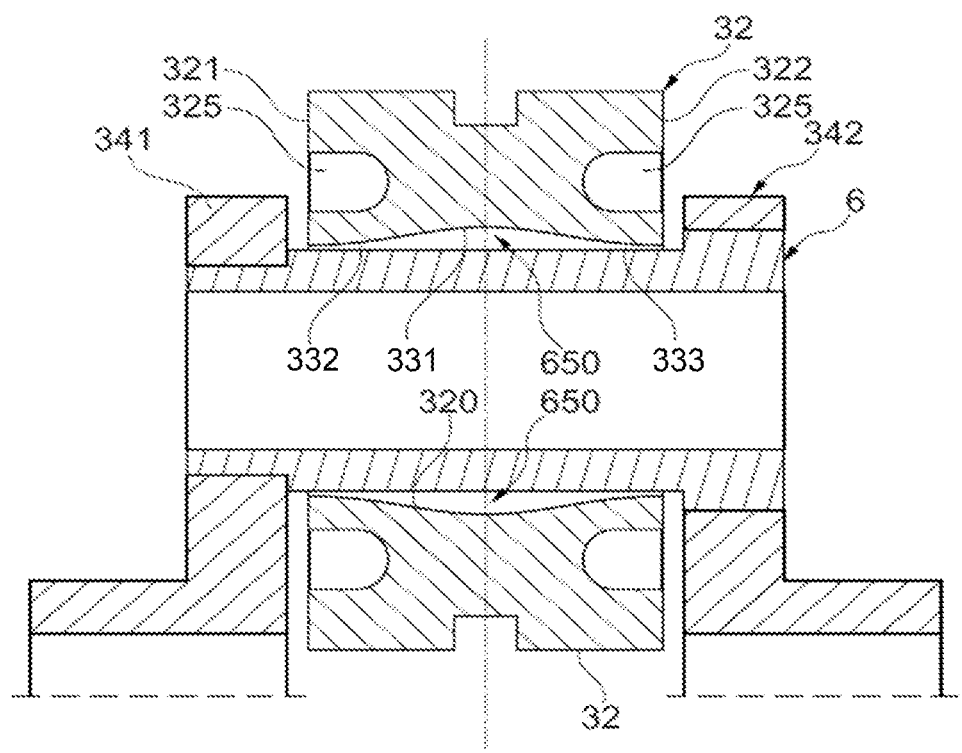
FIG. 9 shows an illustration of a plain bearing pin and of a planet gear in a planetary gear box corresponding to FIG. 7 according to the prior art.

For comparison, FIG. 9 shows a planetary gear box in which the plain bearing pin 6 is configured without a crowning. The discussed deformation of the inner surface 320 of the planet gear 32 with a concave central portion and with two adjoining convex portions, and with a plain bearing gap 650 that varies in height, can be clearly seen here.

The shaping of the plain bearing pin 6 as per FIG. 7 is thus such that the contact face 61 of the plain bearing pin 6 forms an outer contour that corresponds to the inner contour of the planet gear 32 that arises during the deformation of the latter during the operation of the planetary gear box.

Figure 8:
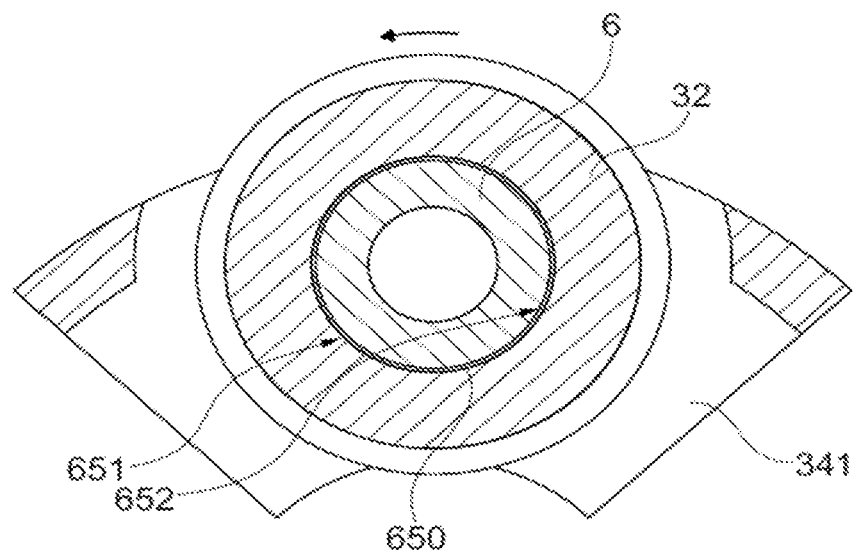
FIG. 8 shows a sectional view of the sub-portion along the line B-B in FIG. 7.

FIG. 8 shows the planetary gear box of FIGS. 5-7 in a sectional illustration along the line B-B in FIG. 7. The plain bearing gap 650 can be seen. In the plain bearing gap 650, there is a zone 651, in which the plain bearing gap 650 is subjected to load, and a zone 652, in which the plain bearing gap 650 is not subjected to load. This is related to the fact that, during operation of the planetary gear box, owing to the rotational movement of the planet gears 32 and the interaction between the toothing of the planet gear 32 and the ring gear 38, the acting load exhibits a maximum at a specific circumferential angle.

The exact shaping of the plain bearing pin illustrated in FIG. 7 will be discussed below on the basis of FIG. 10.

In the illustrated exemplary embodiment, the plain bearing pin 6 is of rotationally symmetrical configuration and has a longitudinal axis 69. Its overall length between the axially foremost end 651 and the axially rearmost end 661 is denoted by L1. This overall length of the plain bearing pin also encompasses portions 65, 66 which project axially in relation to the actual contact face 61 of the plain bearing pin which serve for the fastening of the plain bearing pin 6, correspondingly to FIGS. 4-7, in an axially front carrier plate and an axially rear carrier plate.

The actual contact face 61 of the plain bearing pin 6, at which a plain bearing gap is formed between the plain bearing pin and the planet gear, has an axially front end 610 and an axially rear end 620. The contact face 61 has a length L2.

Furthermore, the contact face 61 is of crowned shape over a length or a portion L3. Here, the crowned shaping may in principle begin at the axial ends 610, 620 of the contact face 61. In the present case, however, it is provided that the respective axial end 610, 620 of the contact face is adjoined by a cylindrical region 68 of the contact face, which is then adjoined by the crowned shaping.

The outer diameter of the contact face 61 is denoted by e. Here, it is true of the outer diameter e and of other radial spacings illustrated in FIG. 10 that this is, by definition, the greatest spacing between two points of the contact face in the respectively observed cross section. The illustration of FIG. 10, which ends at the longitudinal axis 69, thus does not show the outer diameter completely.

The outer diameter e has a maximum D. This is reached along a circumferential line that lies in the axial centre 67 of the plain bearing pin 6, though this is not necessarily the case. The outer diameter e furthermore has a minimum d, which is reached at the axial ends 610, 620 of the contact face 61. The minimum d is identical at both axial ends 610, 620 of the contact face 61, though this is not necessarily the case. Half of the difference between the maximum D and the minimum d of the outer diameter indicates the height h of the crowning.

Figure 10:
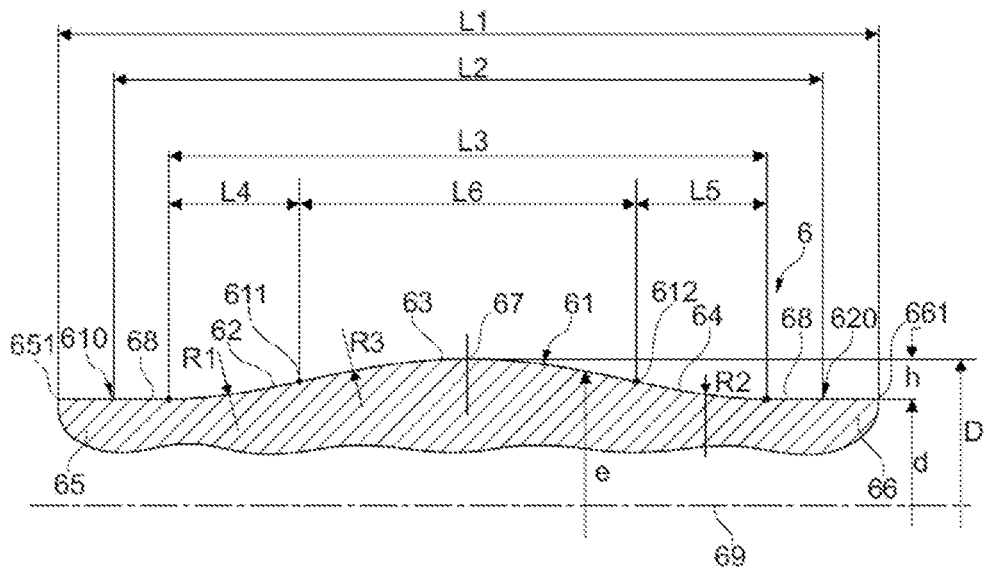
FIG. 10 shows a sectional illustration of an exemplary embodiment of a plain bearing pin with a contact face of crowned configuration, which comprises two concave portions and one convex portion, corresponding to FIGS. 5 to 8.

It is pointed out that, in the illustration of FIG. 10, the portions 65, 66, which each serve for being arranged in a carrier plate, have the minimum outer diameter d. However, this is not necessarily the case. As can be seen for example from FIGS. 11-16, the outer diameter may differ in the portions 65, 66. For the purposes of the present invention, it is the outer diameter of the contact face 61 that is of importance.

The crowned shaping of the contact face 61 in the portion L3 comprises a central, convexly shaped portion L6 and two concavely shaped portions L4, L5, which adjoin the convexly shaped portion L6 to both sides. Here, the concavely shaped portions L4, L5 taper off to the respective cylindrical region 68 and, in the transition to the cylindrical region, run parallel to the longitudinal axis 66, such that there is an edge-free transition between the concavely shaped portions L4, L5 and the respective cylindrical portion 68.

In longitudinal section, the concavely shaped portion L4 forms a first concave curve 62 which extends proceeding from the cylindrical region 68 at the axial end 610 and which transitions into a convex curve 63 that forms the concavely shaped portion L6. The convex curve 63 transitions into a second concave curve 64, which extends as far as the adjacent cylindrical region 68 at the other axial end 620. At the transition between first concave curve 62 and the convex curve 63, there is an inflection point 611 at which the curvature behaviour of the curve formed by the curves 62, 63 changes. At the transition between the convex curve 63 and the second concave curve 64, there is a further inflection point 612.

Here, the first concave curve 62 is formed as a circular arc with the radius R1. The convex curve 63 is formed as a circular arc with the radius R3. The second concave curve 64 is formed as a circular arc with the radius R2, wherein R1 is equal to R2 in the exemplary embodiment illustrated, though this is not necessarily the case. The formation of the concave portions L4, L5 and of the convex portion L6 by circular arcs is associated with the advantage that production by cutting processes is simplified. The shaping of the concave portions L4, L5 and of the convex portion L6 may however in principle follow a specified mathematical function and assume a desired profile through the suitable setting of parameters. For example, provision may be made for the overall curve formed by the partial curves 62, 63, 64 to be described by an nth degree polynomial function.

The maximum D of the outer diameter is formed in the convex portion L6, specifically in the axial centre 67 of said portion. Accordingly, the plain bearing pin 6 illustrated in FIG. 10 is altogether of mirror-symmetrical configuration about the axial centre 67 of the plain bearing pin 6. The lengths L4 and L5 are accordingly identical. However, this is not necessarily the case. Numerous modifications are possible. For example, provision may be made whereby the axial position at which the convex portion L6 forms the maximum D is relocated from the axial centre to one of the axial ends 610, 620. In a further example, the lengths L4, L5 differ. Furthermore, the radii R1, R2 and the minimum outer diameters d at the axial ends 610, 620 may differ. A further alternative may consist in that the maximum D in the convex portion 6 is reached not at a point (in the sectional view) or along a circumferential line (considered three-dimensionally) but is constant over a plateau with an axial length. Alternatives also consist in that a cylindrical region 68 as per FIG. 10 is provided at both ends, at neither of the ends, or only at one of the ends.

Figure 11:
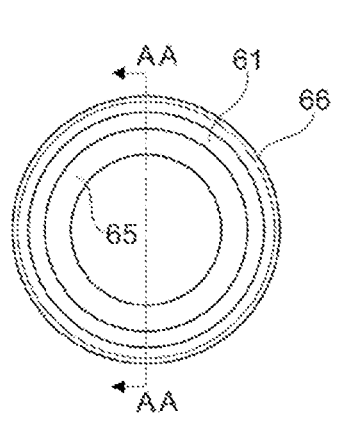
FIG. 11 shows a view of a further exemplary embodiment of a plain bearing pin from the front.
Figure 12:
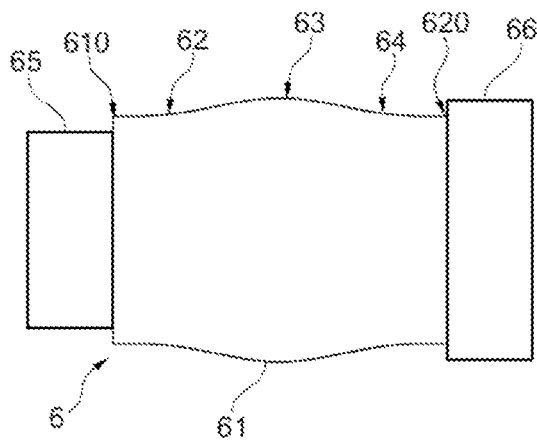
FIG. 12 shows the plain bearing pin of FIG. 11 in a side view.
Figure 13:
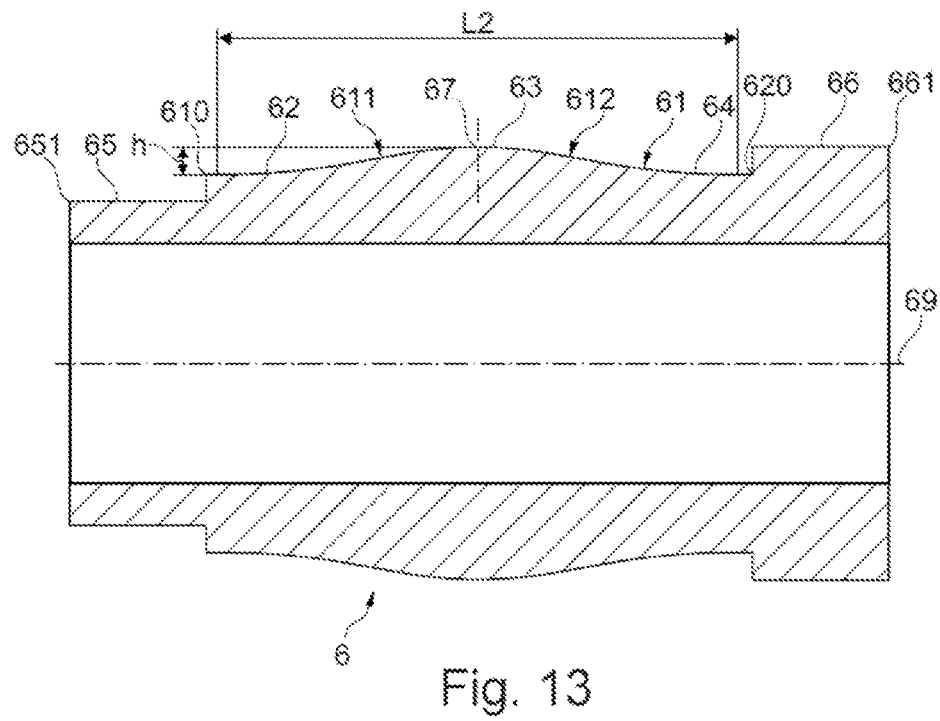
FIG. 13 shows a sectional view of the plain bearing pin of FIGS. 11 and 12 along the line AA-AA in FIG. 11.

FIGS. 11-13 show an exemplary embodiment of a plain bearing pin 6 in a view from the front, in a side view and in a sectional view. FIGS. 11-13 will be referred to collectively. The shaping of the contact face 61 corresponds to the shaping illustrated in FIG. 10. The contact face 61 thus has, in a portion L2, a crowned shape which has two concavely shaped portions, with curves 62, 64 which are concave in the sectional view and which are adjacent to the respective axial end 610, 620 of the contact face 61, and an interposed convexly shaped portion, with a curve 63 which is convex in the sectional view. Between the two concave curves 62 and the convex curve 63, there is formed in each case one inflection point 611, 612. The maximum of the outer diameter is in this case reached in the axial centre 67 in the region of the convexly shaped portion.

It can furthermore be seen that the axial ends 65, 66 of the plain bearing pin, which do not contribute to the contact face 61 and which in the assembled state are fastened in a respective carrier plate, have different outer diameters.

Figures 14, 15:
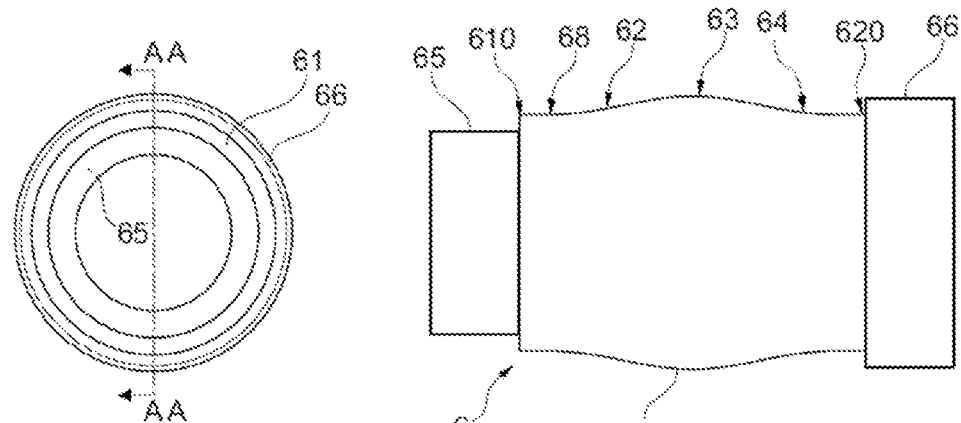
FIG. 14 shows a view of a further exemplary embodiment of a plain bearing pin from the front.
FIG. 15 shows the plain bearing pin of FIG. 14 in a side view.
Figure 16:
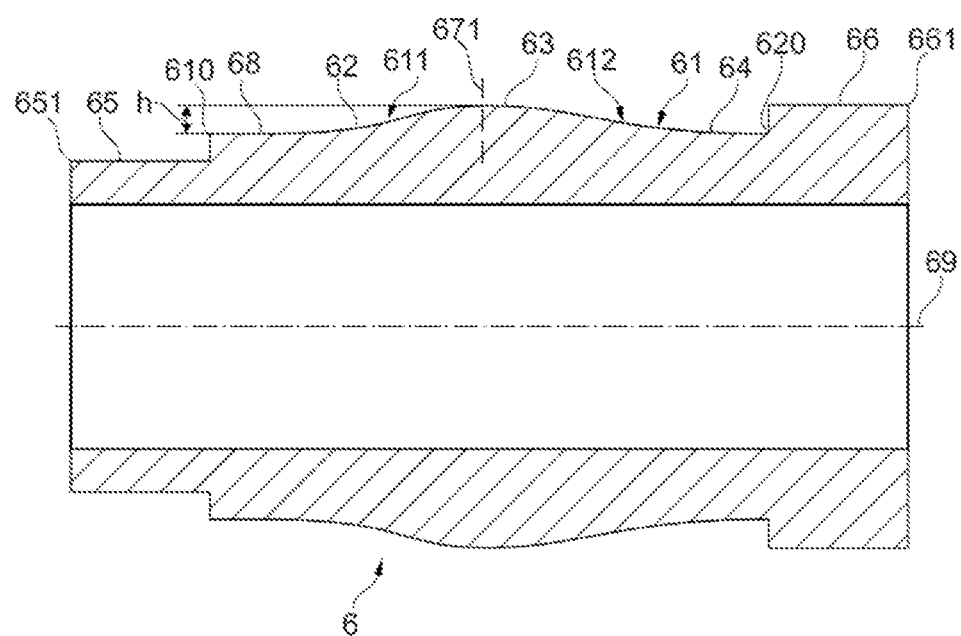
FIG. 16 shows a sectional view of the plain bearing pin of FIGS. 14 and 15 along the line AA-AA in FIG. 14.

FIGS. 14-16 show a further exemplary embodiment of a plain bearing pin in a view from the front, in a side view and in a sectional view. FIGS. 14-16 will be referred to collectively. In this exemplary embodiment, too, the shaping of the contact face 61 has a crowning which comprises two concave portions, with curves 62, 64 which are concave in the sectional view, and a convex portion, with a curve 63 which is convex in the sectional view, wherein the concave portions are formed adjacent to the axial ends 610, 620 of the contact face 61, and the convex portion is formed between the two concave portions. Between the two concave curves 62, 64 and the convex curve 63, there is formed in each case one inflection point 611, 612.

In the exemplary embodiment of FIGS. 14-16, the maximum of the outer diameter is slightly offset in relation to the axial centre of the contact face 61 and is formed at an eccentric point 671, as can be seen in particular from FIG. 16. Accordingly, the axial length of the first concave portion is somewhat shorter than the axial length of the second concave portion. Furthermore, the curvature of the curve 62 in the first concave portion is more pronounced than the curvature of the curve 64 in the second concave portion, that is to say the radii R1, R2 differ in relation to the illustration of FIG. 10. This is associated with the fact that the first axial portion with the curve 62 extends proceeding from a cylindrical region 68 that is adjacent to one axial end 610. In this respect, reference is also made to the explanations relating to FIG. 10. By contrast, the second axial portion, which forms the concave curve 64, runs as far as the other axial end 620 of the contact face 61.

FIGS. 14-16 illustrate, by way of example, an exemplary embodiment of a plain bearing pin that forms an asymmetrical crowning. As discussed, numerous modifications are possible.

The invention is not restricted to the present exemplary embodiments, which should be regarded as merely exemplary. It is in particular pointed out that any of the features described may be used separately or in combination with any other features, unless they are mutually exclusive. The disclosure extends to and comprises all combinations and sub-combinations of one or a plurality of features which are described here. If ranges are defined, said ranges thus comprise all of the values within said ranges as well as all of the partial ranges that lie in a range.

The invention claimed is:

1. A planetary gear box, which has:
   a sun gear, which is rotatable about a rotation axis of the planetary gear box and defines an axial direction of the planetary gear box,
   a plurality of planet gears, which are driven by the sun gear,
   a ring gear with which the plurality of planet gears are in engagement, and
   a plurality of plain bearing pins with each having a longitudinal axis and an external contact face having two axial ends,
   each of the plain bearing pins being arranged in a corresponding one of the planet gears to form a lubricated plain bearing,
   each of the plain bearing pins including a crowning at the contact face, wherein an outer diameter of the contact face decreases from a maximum outer diameter towards at least one of the axial ends,
   wherein the crowning of the contact face is configured such that the contact face is concavely shaped adjacent to the at least one of the axial ends or to a cylindrical region adjoining the at least one of the axial ends,
   wherein the contact face of each of the plain bearing pins, in longitudinal section, forms a first concave curve adjacent to the at least one of the axial ends or to a cylindrical region adjoining the at least one of the axial ends, the first concave curve transitioning into a convex curve, in a region of the maximum outer diameter, and the convex curve transitions into a second concave curve, which extends as far as the other of the axial ends.

2. The planetary gear box according to claim 1, wherein each contact face ends in straight form at the at least one of the axial ends or at the cylindrical region.

3. The planetary gear box according to claim 1, wherein the first and second concave curves and the convex curve each have a curvature that corresponds to a circular arc.

4. The planetary gear box according to claim 1, wherein each contact face is of mirror-symmetrical configuration about an axial center thereof.

5. The planetary gear box according to claim 4, wherein the axial regions in which the first concave curve and the second concave curve extend have a same length, wherein the convex portion is formed centrally between the two axial ends.

6. The planetary gear box according to claim 1, wherein each contact face is of asymmetrical configuration about an axial center thereof.

7. The planetary gear box according to claim 1, wherein the axial regions in which the first concave curve and the second concave curve extend have different lengths.

8. The planetary gear box according to claim 1, wherein each of the plain bearing pins has minimum outer diameters at the two axial ends and the maximum outer diameter between the two axial ends.

9. The planetary gear box according to claim 8, wherein the minimum outer diameters at the two axial ends are identical.

10. The planetary gear box according to claim 1, wherein the maximum outer diameter of each of the plain bearing pins is formed by a circumferential line.

11. The planetary gear box according to claim 1, wherein each of the plain bearing pins has the maximum of its outer diameter at an axial center thereof.

12. The planetary gear box according to claim 1, wherein each of the plain bearing pins has the maximum outer diameter outside an axial center thereof.

13. The planetary gear box according to claim 1, wherein each of the plain bearing pins is of rotationally symmetrical configuration.

14. The planetary gear box according to claim 1, wherein the first concave curve, the convex curve and the second concave curve follow an nth degree polynomial function.

15. The planetary gear box according to claim 1, wherein, at at least one observed operating point of the planetary gear box, the contact face forms an outer contour that corresponds to an inner contour of the respective planet gear that is formed as a result of deformation at the at least one observed operating point.

16. The planetary gear box according to claim 1, wherein each of the planet gears includes, on at least one chosen from an axially front face side and an axially rear face side, a cutout that extends into the each of the planet gears from the planet gear proceeding from the at least one chosen from the axially front face side and the axially rear face side.

17. A gas turbine engine for an aircraft, which has:
 an engine core comprising a turbine, a compressor, and a turbine shaft connecting the turbine to the compressor;
 a fan, which is positioned upstream of the engine core, wherein the fan comprises a plurality of fan blades and is driven by a fan shaft; and
 the planetary gear box according to claim 1, an input of which is connected to the turbine shaft and an output of which is connected to the fan shaft.

18. A method for providing a bearing pin assembly for a planetary gear box, comprising:
 providing a plurality of plain bearing pins with each having a longitudinal axis and an external contact face having two axial ends,
  each of the plain bearing pins including a crowning at the contact face, wherein an outer diameter of the contact face decreases from a maximum outer diameter towards at least one of the axial ends,
  wherein the crowning of the contact face is configured such that the contact face is concavely shaped adjacent to the at least one of the axial ends or to a cylindrical region adjoining the at least one of the axial ends,
  wherein the contact face of each of the plain bearing pins, in longitudinal section, forms a first concave curve adjacent to the at least one of the axial ends or to a cylindrical region adjoining the at least one of the axial ends, the first concave curve transitioning into a convex curve, in a region of the maximum outer diameter, and the convex curve transitions into a second concave curve, which extends as far as the other of the axial ends; and
 mounting a planet gear on each of the plain bearing pins.

* * * * *